(12) United States Patent
Ortiz et al.

(10) Patent No.: US 10,068,440 B2
(45) Date of Patent: Sep. 4, 2018

(54) SYSTEMS AND METHODS FOR TRACKING ASSETS USING ASSOCIATED PORTABLE ELECTRONIC DEVICE IN THE FORM OF BEACONS

(71) Applicant: OPEN INVENTION NETWORK, LLC, Durham, NC (US)

(72) Inventors: Sofia Alexandra Ortiz, Albuquerque, NM (US); Luis M. Ortiz, Albuquerque, NM (US)

(73) Assignee: Open Invention Network, LLC, Durham, NC (US)

( * ) Notice: Subject to any disclaimer, the term of this patent is extended or adjusted under 35 U.S.C. 154(b) by 0 days.

(21) Appl. No.: 14/194,953

(22) Filed: Mar. 3, 2014

(65) Prior Publication Data

US 2014/0191868 A1 Jul. 10, 2014

Related U.S. Application Data

(63) Continuation-in-part of application No. 14/038,987, filed on Sep. 27, 2013, now Pat. No. 9,860,703, which is a continuation of application No. 13/346,206, filed on Jan. 9, 2012, now Pat. No. 8,548,499.

(60) Provisional application No. 61/431,893, filed on Jan. 12, 2011.

(51) Int. Cl.
*H04W 4/02* (2018.01)
*H04W 24/00* (2009.01)
(Continued)

(52) U.S. Cl.
CPC ............ *G08B 5/224* (2013.01); *H04W 4/029* (2018.02); *H04W 12/12* (2013.01); *H04W 4/80* (2018.02)

(58) Field of Classification Search
CPC ....... H04W 24/00; H04W 4/02; H04W 64/00; H04W 4/028; H04W 4/008; H04W 12/12; G08B 5/224
(Continued)

(56) References Cited

U.S. PATENT DOCUMENTS

| 2002/0084903 A1* | 7/2002 | Chaco | G07C 1/10 340/573.1 |
| 2002/0123307 A1* | 9/2002 | Winarski | H04M 1/72572 455/41.2 |

(Continued)

OTHER PUBLICATIONS

Windows Phone 7's 'Find My Phone' feature teased in Microsoft video http://www.engadget.com/2010/10/11/windows-phone-7s-find-my-phone-feature-teased-in-microsoft-vi/, printed Nov. 18, 2014, 3 pages.

*Primary Examiner* — Kamran Afshar
*Assistant Examiner* — Farideh Madani

(57) ABSTRACT

The last known location of a beacon associated with an asset can be determined based on the beacon's last communication with a data network. A beacon can be set up to communicate its location to or through a server to a second client used for locating and tracking the beacon after the beacon obtains a wireless data network connection and registers its most recent location with the server. Beacon location can be based on data network router IP address or GPS information. Location can be stored in memory until a subsequent location and/or wireless connection is obtained. A beacon can also include short range wireless communications to facilitate short range radio frequency communications with a second client that are determined to be in close proximity to the beacon. Short-range communications can be facilitated utilizing Bluetooth communications.

16 Claims, 5 Drawing Sheets

(51) Int. Cl.
*G08B 5/22* (2006.01)
*H04W 12/12* (2009.01)
*H04W 4/029* (2018.01)
*H04W 4/80* (2018.01)

(58) Field of Classification Search
USPC .............................................. 455/456.1–457
See application file for complete search history.

(56) References Cited

U.S. PATENT DOCUMENTS

| | | |
|---|---|---|
| 2004/0123998 A1 | 7/2004 | Berglund et al. |
| 2007/0072620 A1* | 3/2007 | Levitan .................. H04W 4/02 |
| | | 455/456.1 |
| 2007/0072623 A1 | 3/2007 | Shyr et al. |
| 2008/0186162 A1* | 8/2008 | Rajan ...................... G06F 21/88 |
| | | 340/539.13 |
| 2008/0242312 A1 | 10/2008 | Paulson et al. |
| 2008/0309485 A1 | 12/2008 | Raduchel |
| 2010/0165961 A1* | 7/2010 | Rosario ................ H04W 8/005 |
| | | 370/338 |
| 2011/0095883 A1* | 4/2011 | Watts ................ B60R 25/1003 |
| | | 340/539.11 |
| 2012/0042046 A1* | 2/2012 | Petersen ............ G06Q 30/0282 |
| | | 709/219 |
| 2012/0052870 A1* | 3/2012 | Habicher ................ H04W 8/16 |
| | | 455/456.1 |

* cited by examiner

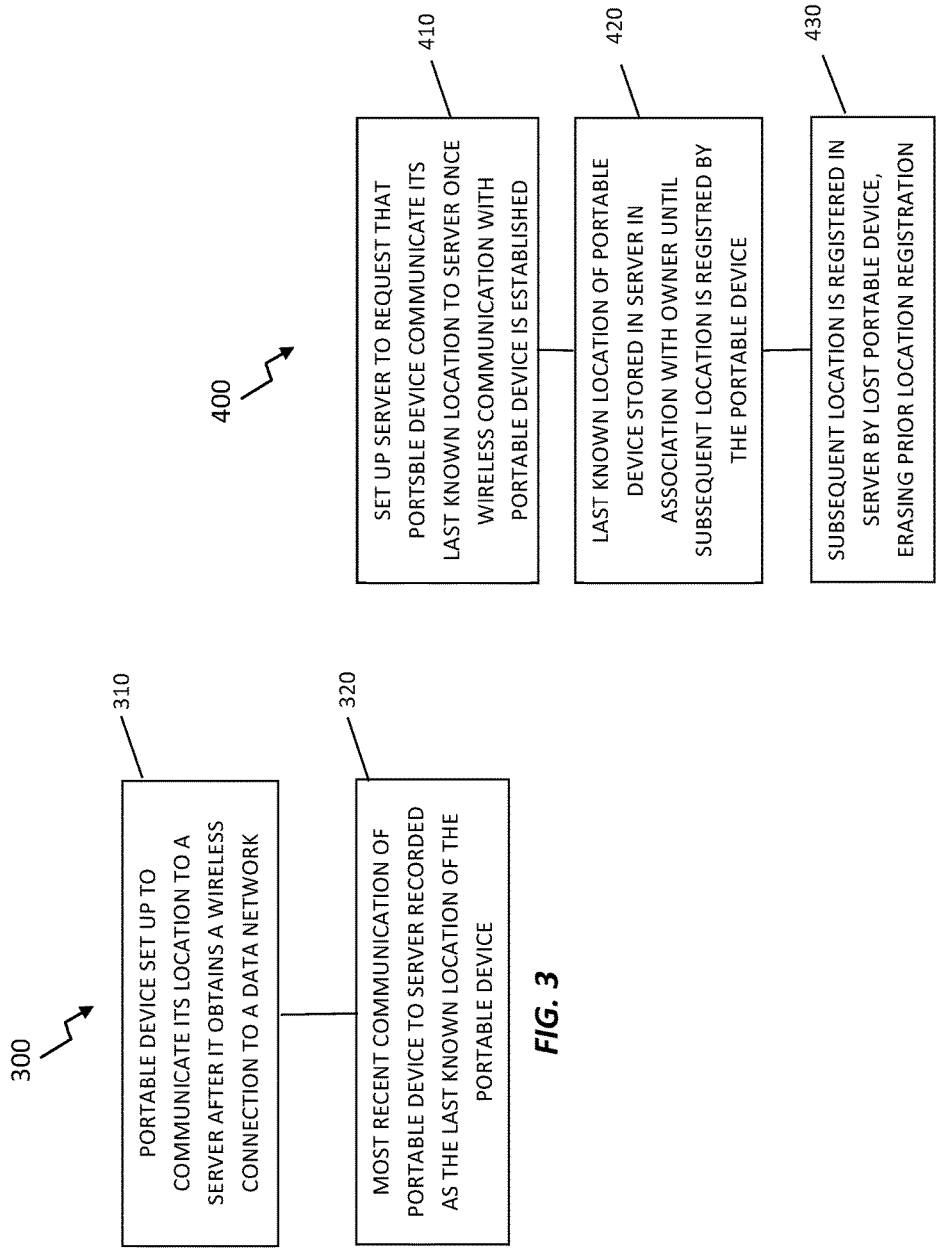

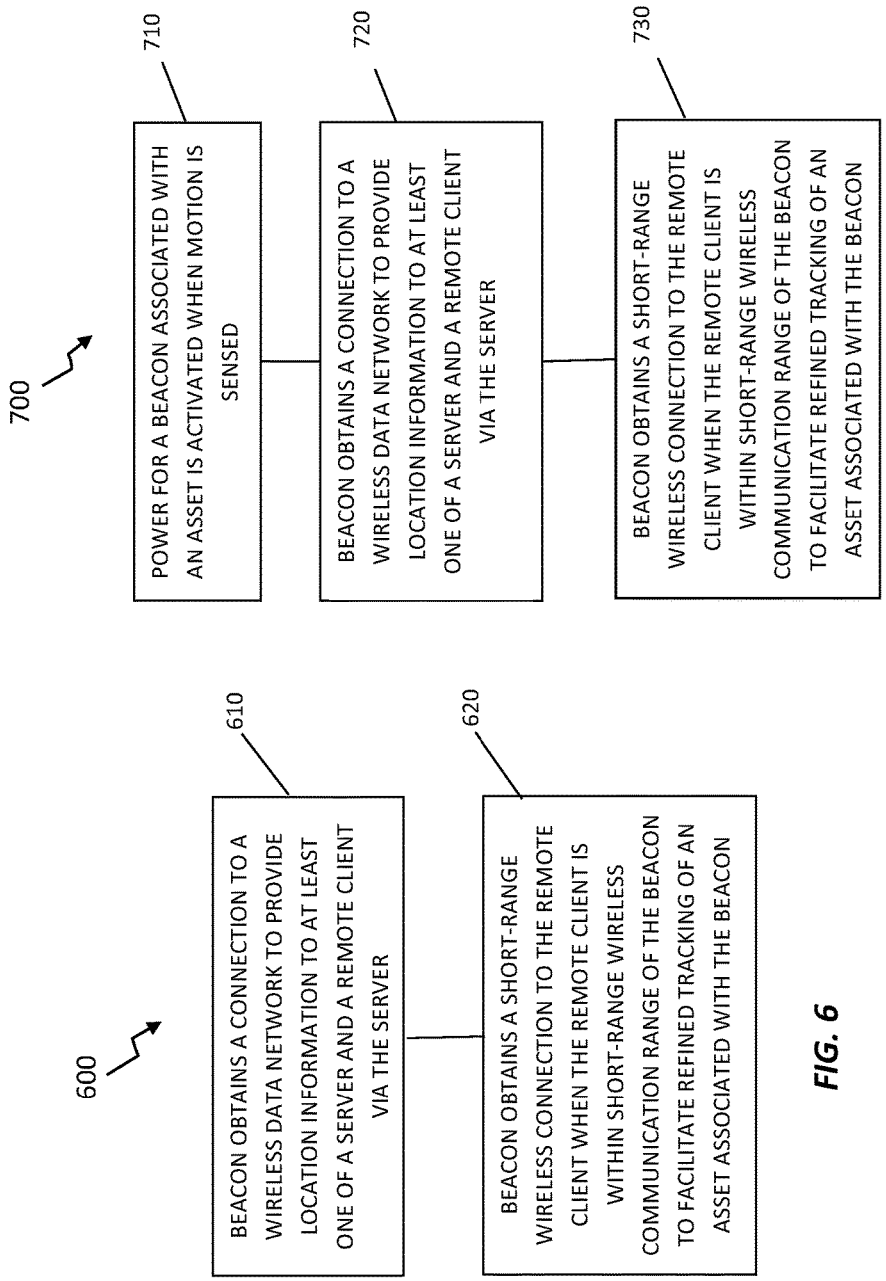

SYSTEMS AND METHODS FOR TRACKING ASSETS USING ASSOCIATED PORTABLE ELECTRONIC DEVICE IN THE FORM OF BEACONS

INVENTION PRIORITY

This patent application claims priority as a continuation-in-part U.S. patent application Ser. No. 14/038,987, filed Sep. 27, 2013 entitled "DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT", which is a continuation of U.S. patent application Ser. No. 13/346,206 (U.S. Pat. No. 8,548,499, issued to Sofia A. Ortiz et al), filed Jan. 9, 2012 entitled "DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT", which claims priority to U.S. Provisional Patent Application No. 61/431,893, entitled "METHODS AND SYSTEMS FOR DETERMINING THE LAST LOCATION OF LOST AND STOLEN PORTABLE ELECTRONIC DEVICES WHEN THEIR WIRELESS ACCESS IS NOT CONTINUOUS USING ELECTRONIC MESSAGING SERVICES," filed Jan. 12, 2011, which are both incorporated herein by reference.

TECHNICAL FIELD

The present invention is generally related to systems and methods for finding/locating/tracking assets. The present invention is further related to systems and methods for determining the location of lost and stolen portable electronic devices. More particularly, the present invention is related to methods and systems for determining the last location lost and stolen portable electronic devices when wireless communications access to the lost or stolen devices is lost or intermittent, and for tracking items associated with portable electronic devices.

BACKGROUND

Portable electronic devices such as smartphones, personal digital assistants, laptop computers, and electronic tablets have become ubiquitous in modern societies. Their use is common among most working adults as well as senior citizens and many children. Portable electronic devices such as tablet computers and handheld computers enables user, among other things, to watch video, access the Internet, communicate with remote friends family and associates, read electronic books and listen to music. Many portable electronic devices include electronics and wireless communications that enable access to and communications through wireless data networks. The problem with the small size of these very useful portable electronic devices is that they can become easily lost or stolen, resulting in a substantial loss of data by and value to their owners.

Tracking devices are another form of portable electronic devices and can be provided in the form of a self-contained portable device. Such beacons have been in use, inter alia, to track the movement and location of people or objects such as motor vehicles or inventory in a warehouse. There are many potential applications for tracking devices. Tracking devices often use RFID as a means for communication with readers for tracking purposes.

Another form of portable electronic devices has recently been released, which is referred to as iBeacon™ by Apple Corporation. ibeacon's are not configured as or utilized as tracking devices, nor are they portable computers. iBeacons are noteworthy as background for the present invention however because they are portable and are utilizing Bluetooth low energy (LE) communications to communicate with other devices such as smartphones at 2.4 MHz and at ranges from less than one foot (<1 ft) and up to 230 ft depending on location, settings, and structural or environmental interference. The iBeacon is not a tracking device, and is not in the field of tracking devices. An iBeacon does not include a GPS module, or networked-based location determination capabilities, and is thus limited in how it is configured and by announcements since its public release in 2014 to stationary applications in sports venues and commercial deployment, such as retail establishments, for providing information to nearby smartphones. Its usefulness is with its ability to communicate data with smartphones using Bluetooth at variable ranges.

Determining the location of portable handheld computing devices has been taught to some extent. For example Apple Computer Corporation also provides its IOS device users portable electronic device finding services, which enables iPhone, iPad, iPod and iTouch users to find their lost or misplaced portable electronic devices on a map via the Internet. The location of lost devices can be found on a map if a device finding option (e.g., "Find My iPhone") is enabled in the settings of an IOS-based device. When this feature is enabled, a user can use any computer to sign into an account (server), or by using the Find My iPhone application on another iPhone, to display the approximate location of the lost device on a full-screen map.

The problem with the device location service prior to Apple Corporation's release of IOS 6 in September 2012 (but after the priority date of the present invention) was that its operation depended on continuous data network communications with the lost portable electronic devices when its location is being determined via the service. If the Wi-Fi feature on a device was not always kept one, or the devices battery ran out of power on a misplaced portable electronic device, the location could no longer be determined. A user may not know that their device is missing until some time has passed and the lost portable electronic device is no longer in communication with a wireless network. What was needed were systems and/or methods that enable the last known location of a lost device to be reported to the portable electronic device user/owner and for messaging capabilities so that updated location information could be delivered to another electronic device used by the lost portable electronic device user. Applicants clearly provided a solution for this need in January 2011 with what is now disclosed in U.S. Pat. No. 8,548,499. Apple also answered the need, after the present inventors, for such services with the release of IOS 6 in September 2012, which included a "Lost Mode" feature for tracking location history and enabling messaging of device location updates to secondary electronic devices.

Although the tracking of portable electronic device such as smartphones has been addressed, the present inventors believe what is still needed are methods and systems to enable tracking of a variety of assets using an associated tracking beacon as the portable electronic device, without limitation to personal hand held devices, that can also incorporate tracking history and messaging capabilities.

SUMMARY

The present invention provides methods and systems for tracking assets utilizing associated portable electronic devices and/or for determining the last known location of a portable electronic device, be it lost, stolen or otherwise requiring tracking, based on the device's last communication with a wireless data network. Communication can be with a second client associated with an owner of the portable device using electronic messaging each time a portable device obtains a new wireless connection to a wireless data network.

In accordance with a feature of the present invention, a server and/or portable electronic device can be set up to communicate the lost portable electronic device location's to a client (e.g., portable or stationary electronic device or computer monitoring the location of the portable electronic device) associated with the owner of the device, either directly or through a server tracking its location and location history as the device obtains a connection to a wireless data network.

In accordance with yet another feature of the present invention, a lost or misplaced portable electronic device operate as a beacon and can include communications hardware (e.g., WiFi, Cellular, Bluetooth LE) and be set up to communicate its location to a client based on at least one of wireless data network router IP address location or portable device GPS location after the device obtains a wireless connection to the wireless data network. GPS capabilities can be included in the portable device when GPS location, rather than network determination, is utilized to determine device location.

In accordance with another feature of the present invention, a portable electronic device can be set up to communicate its location to a server after it obtains a wireless connection to a data network and the location is stored until a subsequent location is registered. A running history of several subsequent locations can also be stored.

In accordance with a feature of the present invention, a portable electronic device can be set up to receive a "locate" command from a remote server after the device obtains a wireless connection to a data network and communicates its location to the server in response to the request.

In accordance with another feature of the present invention, a portable electronic device can be set up to communicate its location to at least one of a server or through a server to an owner e.g., the party interested in determining the location) of the portable electronic device using electronic messaging (e.g., email, SMS text messaging) to a client after the portable electronic device obtains a wireless connection to a data network.

In accordance with another feature of the present invention, a portable electronic device can be set up to communicate its last known location to at least one of a server or through a server to a client on behalf of an owner of the portable electronic device using electronic messaging (e.g., email, SMS text messaging) after the portable device obtains a wireless connection to data network.

In accordance with another feature of the present invention, a server can be programmed to request a portable device to communicate its last known location to the server or through a server to a client on behalf of an owner of the portable device using electronic messaging (e.g., email, SMS text messaging) after the portable device obtains a wireless connection to data network and the location is stored in the server until a subsequent location is registered.

In accordance with yet another features of the present invention, a portable electronic device functioning as a tracking beacon can be provided in association with assets (e.g., vehicles, luggage, packages, machinery, personnel, etc.) to locate the assets and can include hardware and software to communicate including wireless data network communications (e.g., 802.11, Cellular data), short range wireless communications (e.g., Bluetooth), and location determination module (e.g., GPS, network triangulation software). To ensure versatility of use, the beacon can include a long-term power source, rechargeable power and or solar charging capabilities, and can be provided in a weatherproof housing.

In accordance with another feature of the present invention, the tracking beacon can enable versatile tracking by communicating its location with a client via a data network using Wi-Fi or cellular communications and also communicating with the client at short range via short-range radio frequency data communications e.g., Bluetooth), enabling an owner of an asset to first generally locate the asset and then home in on the asset faster with more refined accuracy when at close range so that the asset can be secured.

DRAWINGS

FIG. 3 illustrates a flow diagram 200 of a method for determining the last known location of a lost or stolen device based on the lost or stolen device's last communication with a data network in accordance with features of the invention;

FIG. 4 illustrates a method for determining the last known location of a lost or stolen device based on the lost or stolen device's last communication with a data network.

FIG. 6 illustrates a method of tracking an asset using a beacon with long-range and short-range communications; and FIG. 7 illustrates a method of tracking an asset using a beacon with long-range and short-range communications.

DETAILED DESCRIPTION

Novel features of the present invention will become apparent to those of skill in the relevant art upon examination of the following detailed description of the invention or can be learned by practice of the present invention. It should be understood, however, that the detailed description of the invention and the specific examples presented, while indicating certain features of the present invention, are provided for illustration purposes only because various changes and modifications within the scope of the invention should become apparent to those of skill in the relevant art. from the detailed description of the invention and claims that follow.

"Tracking beacon" and used herein refers to a portable electronic device that can be utilized in associated with assets that need to be located or tracked. A tracking device when used to track assets does not require computing capabilities typically found in portable hand held device such as smartphones, tablets or laptops. A tracking beacon can be provided in association with assets (e.g., vehicles, luggage, packages, machinery, personnel, etc.) to locate the assets and can include hardware and software to communicate including wireless data network communications (e.g., 802.11, Cellular data), short range wireless communications (e.g., Bluetooth), and location determination module (e.g., GPS, network triangulation software). To ensure versatility of use, the beacon can include a long-term power source, rechargeable power and or solar charging capabilities, and can be provided in a weatherproof housing.

Figure 1:
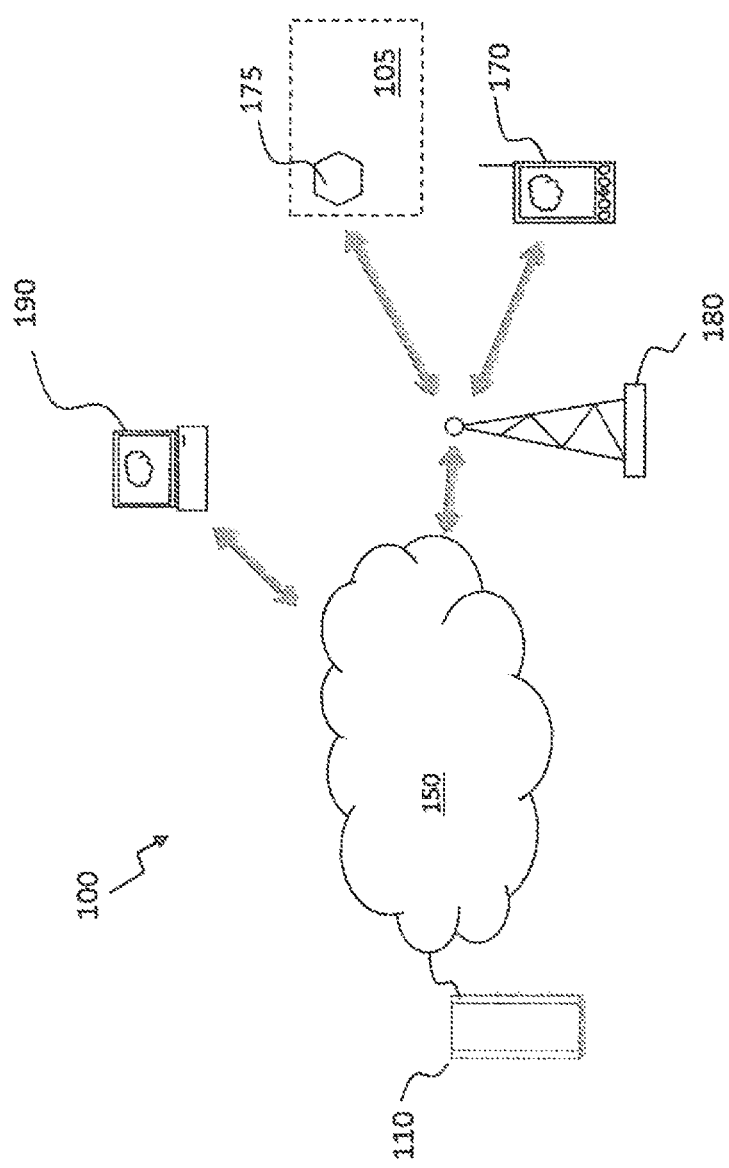
FIG. 1 illustrates a system for determining the last known location of a lost or stolen device based on the lost or stolen device's last communication with a data network.
Figure 2:
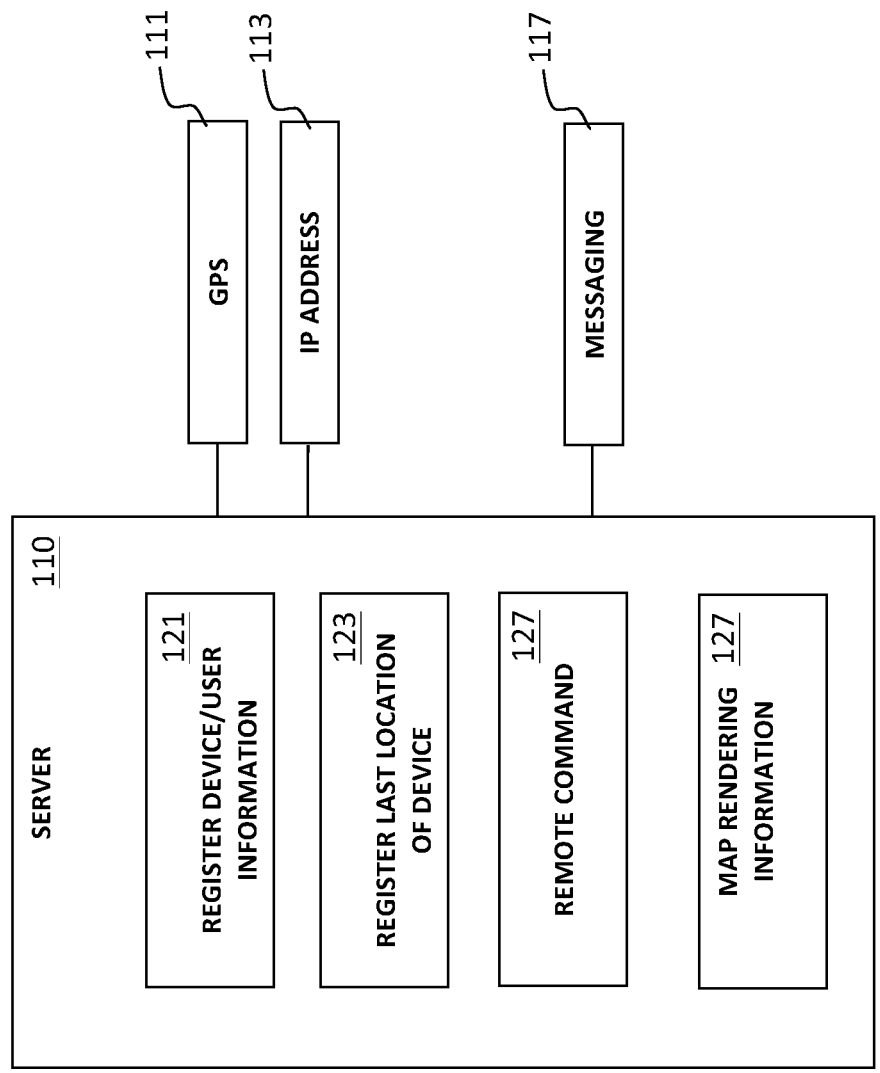
FIG. 2 illustrates a block diagram of modules for a server programmed in accordance with features of the present invention.

Referring to FIG. 1, a system 100 for determining the last known location of a asset based on last communication of a portable electronic device associated with the asset via a data network is shown. The system includes a server 110 programmed to register portable devices and portable device owner information in a memory 115 and communications hardware 160 providing access to a data communications network 150, which can be wired or wireless. Referring to FIG. 2, the server 110 can be programmed to communicate with portable devices/user information 121 and to register the last known device location 123. Lost or stolen device location can be determined using device GPS information 111 and/or network hardware IP address 113 information, which can include the ability to determine physical address information. Referring again to FIG. 1, portable devices can be provided in the form of portable hand held computers 170 (e.g., smartphone, tablet, laptop) as well as tracking beacons 175 associated with an asset 105 requiring tracking. The portable electronic devices can be programmed to communicate their location to a server 110 after the portable device 170/175 obtains a wireless connection to a data network 150 and registers a most recent communication with the server 110 that includes the last known location of the device 170/175.

A portable device 170/175 can be set up to communicate its location to a server 110 after it obtains a wireless connection to a data network 150 and register a most recent communication with the server 110 that includes the last known location of the device 170/175. A portable device 170/175 can be set up to communicate its location based on at least one of wireless data network router IP address location or portable device GPS location after the device obtains a wireless connection to a data network 150. A portable electronic device location is stored until a subsequent location is registered in the server 150 for the portable electronic device 170/175.

Referring again to FIG. 2, the server 110 can also be programmed to providing map-rendering information 127 to a remote client 190, as shown in FIG. 1. The remote client can be a network-computing device (whether portable or stationary) that is being used by the owner of the lost device to find the lost or stolen device. "Owner" as used herein is a term that can include any person interested in the location of an asset including a private person and employee an organization. The last known location of the lost portable device 170/175 to be rendered on a computer generated map generated by a second client 190 based on at least one of: device GPS location, registered Wi-Fi hotspot location, registered router location, connected hardware IP address.

When locating a portable hand held computer as the portable electronic device 170, the server 110 can also be programmed with a remote command module 127 to send at least one of "lost" message, ringtone, lock code (E.g., four digit passcode) and memory wipe command to a lost or stolen portable device 170. Communication can be provided to/from portable devices 170 and a server over data networks including wireless data networks using wireless data communications by the portable devices 170. A portable device's last known location can be provided to user/owners on a map (based on device GPS location, registered Wi-Fi hotspot location, registered router location, IP address) or can be recorded on the server or communicated to the device owner using messaging services (e.g., email, SMS) or can be recorded on the server for the owner to retrieve when the owner/user subsequently accesses the server 110. When a tracking beacon is the portable electronic device 175, then only location information is obtained from the portable electronic device and managed by a server to the extent a data network is involved in the asset tracking.

Referring to FIG. 3, a flaw diagram 300 of a method for determining the last known location of a lost or stolen device based on the portable electronic device's last communication with a data network 150 in accordance with features of the invention is shown. A portable electronic device 170/175 can be set up to communicate its location to a server after it obtains a wireless connection to a data network, as shown in step 310. Then, as shown in step 320, the most recent communication of the portable electronic device 170/175 to the server is recorded in the server as the last known location of the portable electronic device 170/175. A portable electronic device 170/175 can be set up to communicate its location based on at least one of wireless data network router IP address location or portable electronic device GPS location after the portable electronic device 170/175 obtains a wireless connection to a data network 150.

A portable electronic device 170/175 can be set up to communicate its location to a server after it obtains a wireless connection to data network 150. A portable electronic device 170/175 can also be set up to communicate its location based on at least one of wireless data network router IP address location or portable device GPS location after the device obtains a wireless connection to data network 150. A portable electronic device 170/175 can also be set up to communicate its location to a server 110 after it obtains a wireless connection to data network and the location is stored until a subsequent location is registered in the server 110. A portable electronic device 170/175 can also be set up to receive a "locate" command from a remote server after the device obtains a wireless connection to a data network and communicates its location to the server 110 in response to the request. Finally, a portable electronic device 170/175 can be set up to communicate its location to at least one of a server 110 or through a server 110 to an owner of the portable device using electronic messaging after the portable electronic device 170/175 obtains a wireless connection to a wireless data network 150.

Referring to FIG. 4, a method for determining the last known location of a portable electronic device 170/175 based on its last communication with a data network 150 is illustrated. As shown in step 410, a server 110 can be set up (programmed) to request that portable electronic device 170/175 communicate its last known location to the server 110 or through a server 110 to an owner of the lost or stolen portable device using electronic messaging after the lost or stolen portable electronic device 170/175 obtains a wireless connection to a wireless data network. The last known location of the portable electronic device can be stored in the server 110, as shown in step 420, in association with a registered owner of the portable device until the portable device registers a subsequent location. As shown in step 430, a subsequent location of a portable electronic device 170/175 is registered in the server 110, thereby erasing the previous location registered in the server 110. When the portable electronic device 170 is a smartphone, the server 110 can also be programmed to send at least one of "lost" message, ringtone, lock code and wipe command to a portable device and also request the portable device to communicate its last known location to the server 110 or through the server 110 to the owner of the portable electronic device 170/175 using electronic messaging after the portable electronic device obtains a connection to a data network 150 and to the server 110 via a wireless data network and the location is stored until a subsequent location is registered.

Figure 5:
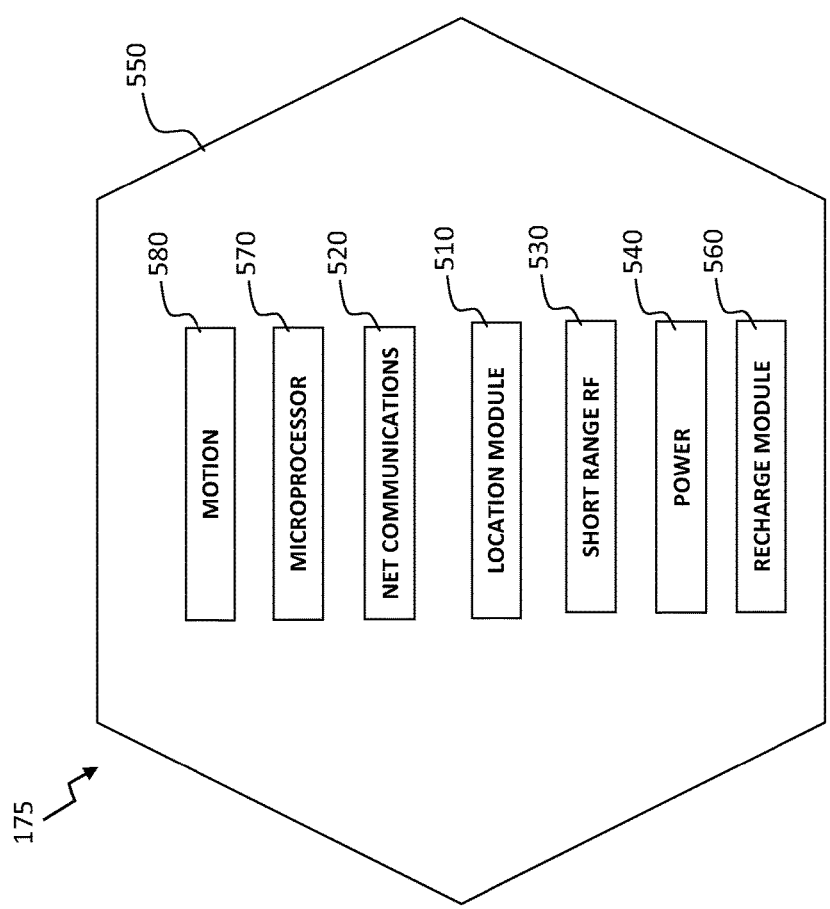
FIG. 5 illustrates a beacon in accordance with features of the present invention.

Referring to FIG. 5, a beacon 175 in accordance with features of the present invention is illustrated. The beacon 175 includes a location module 510. The location module 510 can be GPS electronics, or can be programming in a module capable of determination location utilizing data network assets (e.g., routers, WiFi hotspots, cellular antennas and associated gateways) wherein location is provided based on connection and communication with the network assets. The tracking beacon also includes a wireless data network communications module 520. The wireless data network communications module 520 can provide the tracking beacon 175 with communications access to Wi-Fi and/or cellular networks, and ultimate to other devices being used to track the beacon 175, The beacon 175 can also include a short range RF communications 530, such as Bluetooth LE (low energy), which can allow the beacon to communicate directly with other devices without requiring data network support. The beacon 175 can include a power source 540 that includes replaceable or rechargeable batteries. The beacon 175 can be housed in a weather proof housing 550 for use in association with assets 105 in outdoor applications. The beacon 175 can also include means to recharge the power source, such as a solar module 560. A microprocessor 570 will manage the function of the beacon 175 and enable the beacon 175 to periodically search for open wireless data network connections as well as short range Bluetooth connection to portable clients. The beacon 175 can include a motion sensor 580 to cause the tracking beacon to turn on and search for wireless data network or short-range connections under management of the microprocessor 570. The beacon 175 can remain powered up for a defined period after motion is no longer sensed and then power down to conserve energy. Beacons can be provided with hardware (not shown) to secure it to an asset 105 being tracked or located.

Referring to FIG. 6, a block diagram 600 for a method of tracking an asset using an associated tracking beacon with long-range and short-range communications is illustrated. As shown in step 610, a beacon 175 associated with an asset 105 obtains a connection to a wireless data network to provide location information to at least one of a server and a remote client 190 via the server 110. Then as shown in step 620, the beacon 175 obtains a short-range wireless connection to the remote client when the remote client 190 is within short-range wireless communication range of the tracking beacon 175 to facilitate refined tracking of the asset associated with the beacon.

Referring to FIG. 7, a block diagram 700 for a method of tracking an asset using an associated tracking beacon with long-range and short-range communications is illustrated. As shown in step 710, power for a beacon 175 associated with an asset 105 is activated when motion is sensed. Once powered on, the beacon 175 searches and obtains a connection to a wireless data network to provide location information to at least one of a server and a remote client 190 via the server 110, as shown in step 720. Then as shown in step 730, the beacon 175 obtains a short-range wireless connection to the remote client when the remote client 190 is within short-range wireless communication range of the tracking beacon 175 to facilitate refined tracking of the asset associated with the beacon.

The invention claimed is:

1. A method for determining a location of a beacon associated with an asset based on a last communication of the beacon with a data network, the method comprising:

providing the beacon including location determination capabilities, wireless data network communications, and short range radio frequency communication capabilities, wherein the beacon is programmed to communicate its location through a server to a second client associated with an owner of the beacon using electronic messaging each time the beacon obtains a new wireless connection to a wireless data network, and the beacon is further programmed to communicate directly with the second client over short range of communication without network support when the beacon is within short range rf communication range thereby enabling more refined tracking in comparison to communicating with the second client through the server;

wherein the beacon is further programmed to obtain a new and direct short-range connection with the second client after having a network connection with the second client to perform a more refined short-range tracking with the second client, and in response to changing from communicating with the second client through the server with network support to communicating directly with the second client over the new short range of communication without network support, obtain a global positioning system (GPS) location of the beacon via a GPS network and transmit the GPS location directly to the second client through the short-range connection without network support.

2. The method of claim 1, wherein the beacon is set up to communicate its location based on at least one of a wireless data network router IP address location and a portable device GPS location when the beacon is connected to the second client through the network connection.

3. The method of claim 1, wherein the beacon is set up to communicate its location based on at least one of a wireless data network router IP address location or a portable device GPS location after the beacon becomes powered on and finds and obtains a new wireless connection to the wireless data network.

4. The method of claim 1, further comprising setting up the beacon to communicate its location to the server after it becomes powered on by a motion sensor and obtains a wireless connection to the wireless data network.

5. The method of claim 1, wherein the beacon is set up to communicate its location to the server after the beacon obtains the new wireless connection to the wireless data network and the location is stored until a subsequent location is registered in the server.

6. The method of claim 2, further comprising setting up the beacon to communicate its location to the server after it obtains the new wireless connection to the wireless data network and the location is stored until a subsequent location is registered in the server.

7. The method of claim 1, further comprising setting up the beacon to receive a "locate" command from a remote server after the beacon obtains the new wireless connection to the wireless data network and communicates its location to the server in response to the locate command.

8. A method for determining a location of a beacon associated with an asset based on last communication of the beacon with a data network, the method comprising:

programming a server to communicate with a beacon having network communications and a location module to obtain a last location of the beacon, and communicate the location to a second client associated with a user tracking the beacon using electronic messaging, wherein the location is determined when the beacon is powered on and obtains a new wireless connection to the wireless data network; and programming the beacon to communicate directly with the second client over short range of communication without network support when the beacon is within short range rf communication range of the second client thereby enabling more refined tracking in comparison to communicating with the second client through the server;

wherein the beacon is further programmed to obtain a new and direct short-range connection with the second client after having a network connection with the second client to perform a more refined short-range tracking with the second client, and in response to changing from communicating with the second client through the server with network support to communicating directly with the second client over the new short range of communication without network support, obtain a global positioning system (GPS) location of the beacon via a GPS network and transmit the GPS location directly to the second client through the short-range connection without network support.

9. The method of claim 8, wherein the beacon also includes short-range radio frequency communication hardware that facilitates the direct short range communications with the second client without network support when the second client comes within short range radio frequency communication range of the beacon.

10. The method of claim 8, further comprising programming the beacon to communicate its location to at least one of the server or through the server to an owner of the beacon using electronic messaging after the beacon obtains a new wireless connection to the wireless data network.

11. The method of claim 10, further comprising programming the beacon to communicate its location to at least one of the server or through the server to the second client using electronic messaging after the beacon obtains the new wireless connection to the wireless data network.

12. The method claim 8, further comprising programming the beacon to communicate its location to the server after it becomes powered on by a motion sensor and obtains the new wireless connection to the wireless data network.

13. A beacon operable within a system for determining its last known location based on its location and its last communication with a data network, the beacon comprising:
 a microprocessor programmed to determine a location of the beacon and communicate wirelessly with a data network and communicate via short-range radio frequency communication with other electronic devices;
 a location module cooperating with the microprocessor to determine the location of the beacon when it is powered on;
 a network communication module cooperating with the microprocessor and programmed to determine the location of the beacon based on at least one of GPS and a last communication between the beacon and the data network supporting wireless communication of the beacon; and
 a short-range radio frequency module supporting communications with portable devices determined to be within a short-range communications range of the beacon;
 wherein the network communication module provides location information using network support, through a server, to a portable device tracking a location of the beacon over the data network, and the microprocessor is programmed to cause the short-range radio frequency module to communicate directly with the portable device to locate the beacon using refined location information without network support when the beacon is within short-range rf communications range thereby enabling more refined tracking in comparison to communicating with the portable device through the server;
 wherein the beacon is further programmed to obtain a new and direct short-range connection with the portable device after having a network connection with the portable device to perform a more refined short-range tracking with the portable device, and in response to changing from communicating with the portable device through the server with network support to communicating directly with the portable device over the new short range of communication without network support, obtain a global positioning system (GPS) location of the beacon via a GPS network and transmit the GPS location directly to the portable device through the short-range connection without network support.

14. The beacon of claim 13, wherein the location module is configured to determine the beacon location based on at least one of: a device GPS location, a registered Wi-Fi hotspot location, a registered router location, and a connected hardware IP address information.

15. The beacon of claim 13, further comprising a motion sensor, wherein said motion sensor causes the beacon to power on and resume operation if movement of the beacon is sensed.

16. The beacon of claim 13, wherein the short-range radio frequency module facilitates refined location tracking of the beacon by the portable device located within a predetermined range of the beacon.

* * * * *